(12) United States Patent
Pott

(10) Patent No.: US 7,395,659 B2
(45) Date of Patent: Jul. 8, 2008

(54) HYBRID VEHICLE AND METHOD FOR OPERATING A HYBRID VEHICLE

(75) Inventor: Ekkehard Pott, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 148 days.

(21) Appl. No.: 11/319,240

(22) Filed: Dec. 28, 2005

(65) Prior Publication Data
US 2006/0156710 A1 Jul. 20, 2006

Related U.S. Application Data

(63) Continuation of application No. PCT/EP2004/006985, filed on Jun. 28, 2004.

(30) Foreign Application Priority Data

| Jun. 30, 2003 | (DE) | ................................. 103 29 598 |
| Jun. 30, 2003 | (DE) | ................................. 103 33 210 |

(51) Int. Cl.
 *F01N 3/00* (2006.01)
(52) U.S. Cl. ........................................................ 60/285
(58) Field of Classification Search .................... 60/285
See application file for complete search history.

(56) References Cited

U.S. PATENT DOCUMENTS

| 5,850,734 | A | * | 12/1998 | Ketcham ...................... 60/274 |
| 6,057,605 | A | * | 5/2000 | Bourne et al. ............. 290/40 C |
| 6,173,569 | B1 | * | 1/2001 | Kusada et al. .................. 60/277 |
| 6,253,866 | B1 | * | 7/2001 | Kojima ....................... 180/65.2 |
| 6,397,963 | B1 | * | 6/2002 | Lennevi ...................... 180/65.2 |
| 6,427,793 | B1 | * | 8/2002 | Hanada et al. ............. 180/65.2 |
| 6,520,160 | B2 | * | 2/2003 | Kojima et al. ............... 123/492 |
| 6,718,758 | B1 | * | 4/2004 | Suzuki ......................... 60/300 |

| 2001/0032621 | A1 | | 10/2001 | Kojima et al. ............... 123/492 |
| 2006/0016175 | A1 | * | 1/2006 | Pott et al. ..................... 60/285 |

(Continued)

FOREIGN PATENT DOCUMENTS

DE 100 41 535 A1 3/2001

(Continued)

OTHER PUBLICATIONS

PCT International Search Report for application No. PCT/EP2004/006985, 4 pages, Jun. 28, 2004.

*Primary Examiner*—Thomas Denion
*Assistant Examiner*—Loren Edwards
(74) *Attorney, Agent, or Firm*—Baker Botts L.L.P.

(57) ABSTRACT

A hybrid vehicle has an internal combustion engine and an electric motor, each of which can deliver a torque, particularly in order to drive at least one vehicle wheel. An exhaust gas system having a catalytic converter system is assigned to the internal combustion engine. The conversion activity of the catalytic converter system depends on predetermined activity parameters. The value of the conversion activity is determined in a predetermined time interval T_Kat. The torque output of the electric motor is increased, preferably depending on the load and the torque output of the internal combustion engine is reduced in order to attain a predetermined conversion threshold of the conversion activity of the catalytic converter system, if the value of the conversion activity lies below said threshold. For this purpose, a device is provided for controlling the torque output of the internal combustion engine and of the electric motor.

18 Claims, 5 Drawing Sheets

U.S. PATENT DOCUMENTS

2006/0213186 A1\* 9/2006 Pott .......................... 60/285

FOREIGN PATENT DOCUMENTS

| EP | 0 919 423 | A2 | 6/1999 |
|----|-----------|----|--------|
| EP | 0 922 599 | A2 | 6/1999 |
| EP | 1 085 177 | A2 | 3/2001 |
| EP | 1 182 074 | A2 | 2/2002 |
| EP | 1 291 510 | A2 | 3/2003 |
| WO | 2005/000617 | A1 | 1/2005 |

\* cited by examiner

HYBRID VEHICLE AND METHOD FOR OPERATING A HYBRID VEHICLE

CROSS-REFERENCE TO RELATED APPLICATION

This application is a continuation of co-pending International Application No. PCT/EP2004/006985 filed Jun. 28, 2004 which designates the United States, and claims priority to German application number DE 103 29 598.4 filed Jun. 30, 2003 and German application number DE 103 33 210.3 filed Jun. 30, 2003, which are incorporated herein by reference in their entirety.

TECHNICAL FIELD

The present invention relates to a hybrid vehicle and a method for operating a hybrid vehicle in accordance with the preambles of the independent claims.

BACKGROUND

Vehicles with parallel hybrid drive systems have an internal combustion engine as well as at least one electric motor that drives at least one vehicle wheel using the same or another drive train of the internal combustion engine. As long as the electric motor can also be operated as a generator, then it is possible for the electric motor in almost every point of the vehicle operating map to provide motoric support or regenerative additional loading by the electric motor and to decouple from the internal combustion engine operation to a certain extent.

This is accompanied by a change in the exhaust gas quality, particularly with respect to the exhaust gas mass flow, the exhaust gas temperature, as well as the composition of pollutants. Such a change in the exhaust gas quality affects the functioning and the efficiency of a catalytic converter system arranged downstream of the internal combustion engine. The patent application EP 1 182 074 A2 describes a method in which the operation of the electric motor as a generator is used to increase the load of the internal combustion engine in case of a catalytic converter temperature that lies below a characteristic light-off temperature. This helps achieve an increased exhaust gas temperature and a faster activation of the catalytic converter system after a cold start. It is further suggested in this patent application to bring about an unloading of the internal combustion engine by the motoric operation of the electric motor in case of a motor or catalytic converter at operating state temperature.

This operating mode is very unilaterally designed for shortening the light-off phase since it does not take into consideration that the increase in the load of the internal combustion engine also involves a considerable increase in the untreated exhaust gas emission, especially the untreated exhaust gas emissions of hydrocarbons. Thus the reduction of the emission of pollutants, particularly of hydrocarbons, by shortening the light-off phase of the catalytic converter system can be overcompensated by the increase in the untreated exhaust gas emissions and can sometimes lead to increased total emissions downstream of the catalytic converter system (tail pipe emissions).

Furthermore, a hybrid vehicle is known from the patent application DE 100 41 535 A1 in which a generator generates electrical energy in case of a non-activated catalytic converter and thus increases the load of the internal combustion engine. This increases the temperature of the internal combustion engine, the temperature of the exhaust gas released by the internal combustion engine or the temperature of the coolant of the internal combustion engine for an accelerated activation of the catalytic converter.

SUMMARY

The object of the present invention is to create a hybrid vehicle as well as a method for operating a hybrid vehicle in which it is possible to influence a conversion activity of a catalytic converter system assigned to the internal combustion engine by means of an optimized torque output of the internal combustion engine and of the electric motor for attaining a predetermined conversion threshold.

This object can be achieved by a method for operating a hybrid vehicle comprising an internal combustion engine, at least one electric motor, each for the output of a torque to at least one vehicle wheel, and an exhaust gas system having a catalytic converter system for at least one exhaust gas component assigned to the internal combustion engine, wherein a conversion activity of the catalytic converter system is dependent on predetermined activity parameters, the method comprising the steps of determining the value of the conversion activity for attaining a predetermined conversion threshold of the conversion activity for at least one exhaust gas component in a predetermined time interval; and if the value lies below said threshold, then increasing the torque output of the electric motor, and reducing the torque output of the internal combustion engine as compared to an operation of the hybrid vehicle without the provision of a torque by the electric motor.

The step of increasing the torque output of the electric motor can be performed depending on the load. The exhaust gas emission downstream of the catalytic converter system can be determined and the torque output of the internal combustion engine and/or of the electric motor can be increased and/or decreased such that a predetermined emission limit value downstream of the catalytic converter system is exceeded. The activity parameters may contain at least one catalytic converter temperature or an exhaust gas mass flow. The predetermined time interval can be associated with a cold start. The electric motor may attend to a torque request of at least 60%, or of at least 80% or of at least 90% within the predetermined time interval. The combustion efficiency of the internal combustion engine can be deteriorated in a targeted manner within the predetermined time interval for increasing an exhaust gas temperature and an exhaust gas mass flow. The ignition angle can be shifted for retardation for increasing the catalytic converter temperature. The internal combustion engine can be operated using a higher air charge for at least partially compensating an efficiency deterioration of the internal combustion engine due to a retardation of the ignition angle. A catalytic converter heating with a chemical-thermal energy input into the exhaust gas system can be provided where said energy input is reduced by at least 10%, 25% or preferably 40% as compared to an operation without the provision of a torque by the electric motor. A catalytic converter heating can be provided that has a value, which is reduced in terms of time by at least 10%, 25% or 40% as compared to an operation without the provision of a torque by the electric motor. The electric motor may provide a maximum power of at least 2 KW, 3.5 KW, or 5 KW per ton of vehicle empty weight in a speed range of 700-1500 l/min, or 1,000 l/min to 1,500 l/min. The electric motor can be arranged between a crankshaft outlet of the internal combustion engine and a gearbox inlet. The catalytic converter system may contain at least one precatalytic converter located close to the engine and at least one main catalytic converter arranged downstream of the precatalytic converter. The precatalytic converter located close to the engine can be arranged at a distance of less than 500 mm or less than 400 mm or less than 300 mm of the average exhaust gas run length from the cylinder head flange. The conversion threshold can be a light-off value for at least one of the exhaust gas components: hydrocarbon, carbon monoxide or nitrogen oxide of the precatalytic converter and the main catalytic converter. The internal combustion engine can be a direct-injection gasoline engine capable of a lean-burn. The internal combustion engine can also be a direct-injection gasoline capable of stratified-charge capable of lean-burn. The internal combustion engine according to the New European Driving Cycle may have a thermally undamaged catalytic converter system that comprises at least one precatalytic converter located close to the engine and at least one $NO_x$ storage catalytic converter arranged downstream, where at least one of the catalytic converters has a precious metal content of >110 g/ft$^3$ and attains a hydrocarbon emission of <0.07 g/km and a nitrogen oxide emission of <0.05 g/km in a stratification operation unit in terms of time of at least 250 seconds without provision of a torque by the electric motor. If the torque is provided by the electric motor and if the precatalytic converter has a precious metal content of <100 g/ft$^3$, preferably <80 g/ft$^3$ and most preferably <60 g/ft$^3$, then at least one of the catalytic converters attains a hydrocarbon emission of lesser than 0.1 g/km and a nitrogen oxide emission of lesser than 0.08 g/km according to the New European Driving Cycle. The precatalytic converter having a lowered precious metal content can be subjected to an oven aging process for 4 hours at 1100° C. in an atmosphere of 2% $O_2$ and 10% $H_2O$ and the $NO_x$ storage catalytic converter having a lowered precious metal content can be subjected to an oven aging process for four hours at 850° C. in an atmosphere of 2% $O_2$ and 10% $H_2O$.

The object can also be achieved by a hybrid vehicle comprising an internal combustion engine and at least one electric motor, each of which can deliver a torque, particularly in order to drive at least one vehicle wheel, an exhaust gas system assigned to the internal combustion engine and comprising a catalytic converter system whose conversion activity depends on predetermined activity parameters, and a device operable to control the torque output of the internal combustion engine and of the electric motor by means of which the value of the conversion activity for attaining a predetermined conversion threshold of the conversion activity of the catalytic converter system for at least one exhaust gas component is determined in a predetermined time interval, and if the value lies below said threshold, the torque output of the electric motor is increased and the torque output of the internal combustion engine is decreased as compared to an operation of the hybrid vehicle without the provision of a torque by the electric motor.

The torque output of the electric motor may depend on the load. The internal combustion engine according to the New European Driving Cycle may have a thermally unaffected catalytic converter system that comprises at least one precatalytic converter located close to the engine and at least one $NO_x$ storage catalytic converter arranged downstream, where at least one of the catalytic converters has a precious metal content of >110 g/ft$^3$ and attains a hydrocarbon emission of <0.07 g/km and a nitrogen oxide emission of <0.05 g/km in a stratification operation unit in terms of time of at least 250 seconds without provision of a torque by the electric motor. If the torque is provided by the electric motor and if the precatalytic converter has a precious metal content of <100 g/ft$^3$, preferably <80 g/ft$^3$ and most preferably <60 g/ft$^3$, then at least one of the catalytic converters attains a hydrocarbon emission of less than 0.1 g/km and a nitrogen oxide emission of less than 0.08 g/km according to the New European Driving Cycle.

In the hybrid vehicle according to the present invention, a device for controlling the torque output of the internal combustion engine and of the electric motor is provided, by means of which the value of the conversion activity of the catalytic converter system is determined. Depending on this value for a predetermined time interval T_Kat the torque output of the electric motor is increased and the torque output of the internal combustion engine as compared to an operation of the hybrid vehicle without the provision of a torque by the electromotor is reduced. This control preferably takes place depending on the load with a view to controlling the torque.

By reducing the torque output of the internal combustion engine, it is possible to reduce the untreated emission, particularly of hydrocarbons for a predetermined time interval while simultaneously favorably influencing the conversion activity of the catalytic converter system for attaining the predetermined conversion threshold. The method according to the present invention allows an optimized use of the torque output of the internal combustion engine and of the electric motor with a view to attaining a predetermined conversion threshold.

In a particularly preferred embodiment of the present invention, the exhaust gas emission downstream of the catalytic converter system is determined and the torque output of the internal combustion engine or of the electric motor increases or decreases when a predetermined emission limit value downstream of the catalytic converter system is fallen short of. This aims at overcoming the unilateral design of the operating mode of a hybrid vehicle as well as at shortening a light-off phase and takes into account the interrelationship of the untreated emission and the conversion activity while limiting the exhaust gas emission that is actually released into the environment.

It is particularly expedient to increase the catalytic converter temperature by retarding the ignition angle. In an additional preferred embodiment, deterioration in the efficiency of the internal combustion engine, particularly due to a retardation of the ignition angle, is possible by operating using a higher air charge. Thus the exhaust gas mass flow can be simultaneously increased with an increase in the catalytic converter temperature.

In order to achieve a marked unloading of a typical internal combustion engine, it is preferable if the electric motor provides a maximum power of at least 2 KW, preferably 3.5 KW, most preferably 5 KW per ton of vehicle empty weight, preferably in a speed range of 700-1,500, and ideally 1,000/min to 1,500/min.

It is possible to achieve particularly effective exhaust gas purification using a catalytic converter that contains at least one precatalytic converter located close to the engine and at least one main catalytic converter arranged downstream of the precatalytic converter. According to the present invention, the conversion activity of the precatalytic converter in particular is increased quickly and effectively.

BRIEF DESCRIPTION OF THE DRAWINGS

Additional embodiments and advantages of the present invention are also specified the following description and the drawings. The drawings illustrate in.

DETAILED DESCRIPTION

Figure 1:
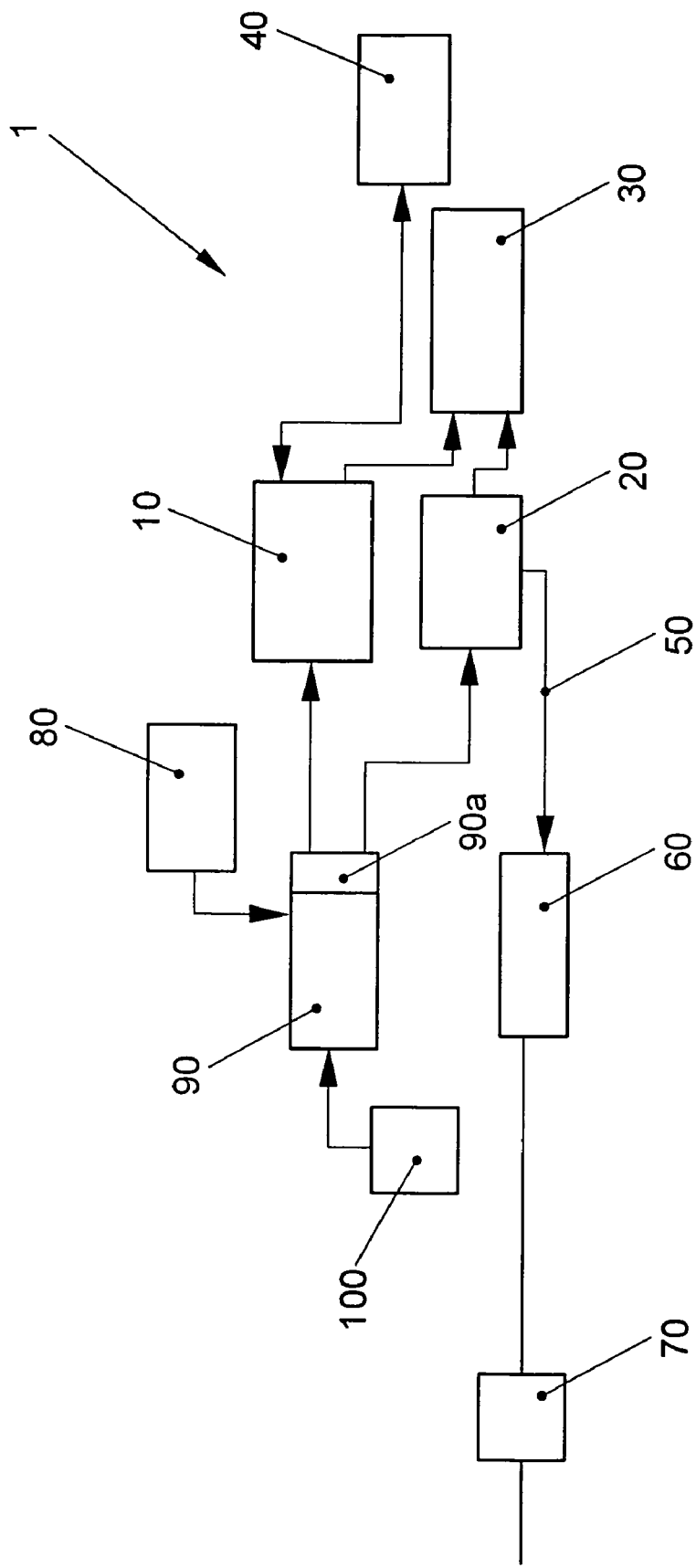
FIG. 1 a hybrid drive system having a control system for a hybrid vehicle according to the present invention.

FIG. 1 illustrates schematically a hybrid drive system 1 for a hybrid vehicle (not illustrated). An electric motor 10 and an internal combustion engine 20 are coupled to a gearbox 30 that is coupled to at least one vehicle wheel (not illustrated in FIG. 1). It is preferred to arrange the electric motor 10 between a crankshaft outlet of the internal combustion engine 20 and a gearbox inlet. The electric motor 10 is electrically coupled to an electrical energy storage device, for example a rechargeable battery or the like. An exhaust gas system 50 having a precatalytic converter 60 that is located close to the engine and a main catalytic converter 70 that is arranged downstream are assigned to the internal combustion engine 20. A motor control unit 90 receives control signals from control sensors 80, for example the accelerator pedal module or an anti-lock braking system. The motor control unit also receives from sensors 100 the values of operating parameters of the hybrid vehicle, particularly of the electric motor 10, of the internal combustion engine 20, of the exhaust gas system 50 as well as of other vehicle components.

In a preferred embodiment of the present invention, the internal combustion engine 20 is a direct injection gasoline engine capable of lean-burn. A direct injection gasoline engine capable of stratified charge is particularly preferable since such an engine helps largely economize the fuel consumption in lower load-speed ranges as compared to a conventional gasoline engine. It is expedient, particularly in these embodiments of the present invention, to design the catalytic converter system in such a way that the precatalytic converter 60 is a 3-way catalytic converter and the main catalytic converter 70 is a $NO_x$ storage catalytic converter. The precatalytic converter 60 preferably serves to purify a stoichiometric exhaust gas, to convert hydrocarbons (HC) in case of lean exhaust gas and to improve the exhaust gas purification during a cold start. In order to enable particularly a fast heating of the precatalytic converter, the precatalytic converter 60 is arranged at a distance that is less than 500 mm, or less than 400 mm or most preferably less than 300 mm of the average exhaust gas running length of the cylinder head flange in the exhaust gas system 50. The $NO_x$ storage catalytic converter 70 is preferably designed for storing nitrogen oxides ($NO_x$) in case of lean exhaust gas. Depending on the exhaustion of the catalytic converter system with $NO_x$ and sometimes depending on additional boundary conditions, a regeneration of the $NO_x$ storage catalytic converter using a stoichiometric to fuel-rich exhaust gas is necessary.

The conversion activity of the catalytic converter system and/or of its components precatalytic converter 60 and $NO_x$ storage catalytic converter 70 depends on activity parameters, particularly the catalytic converter temperature. Starting from a minimum temperature, the so-called light-off temperature, the conversion rate exceeds a limit of 50%. In general, the light-off temperature of a catalytic converter system varies for the different pollutant components such as HC or $NO_x$.

Additional activity parameters of the catalytic converter system are values of an exhaust gas mass flow, the untreated emission of exhaust gas components as well as the exhaustion of the catalytic converter with $NO_x$ and/or sulfur oxides ($SO_x$). The values of these activity parameters are determined depending on the operating parameters of the internal combustion engine, and if necessary by using a model of the catalytic converter system with the help of signals of the sensors 100 and are evaluated in the control units 90.

In a preferred embodiment, the control unit 90 contains one or more microprocessors, data memory and interfaces as well as a device 90a, by means of which the total torque delivered by the electric motor 10 and the internal combustion engine 20 is determined depending on the control signals of the sensors 80 and is provided, at least in part, to the gearbox 30. The coupling between the electric motor 10 and the internal combustion engine 20 enables both a negative as well as a positive torque transmission between both these components.

The sensors 100 that are not illustrated in greater detail in FIG. 1, contain sensors for measuring or determining operating parameters, preferably of the storage device 40, of the electric motor 10, of the internal combustion engine 20 and of the exhaust gas system 50. In particular, lambda probes can be arranged in the exhaust gas system 50 upstream of the precatalytic converter 60, downstream of the precatalytic converter 60, upstream of the main catalytic converter 70 or downstream of the main catalytic converter 70. Furthermore, $NO_x$ sensors, $SO_x$ sensors or hydrocarbon sensors can be arranged at different places of the exhaust gas systems. Temperature sensors can be provided at different installation locations in order to measure the temperature of the exhaust gas or of the catalytic converter system.

The method according to the present invention aims at optimizing the torque output of the internal combustion engine and of the electric motor for attaining a predetermined conversion threshold and at optimizing the conversion activity of the catalytic converter system 60, 70. Such an optimization is preferably provided in a time interval Temp_K after a cold start of the vehicle. However, if necessary, such an optimization can also take place in other operating phases of the internal combustion engine 20. After a cold start the temperature of the catalytic converter system initially lies below the light-off temperature. In this case, the conversion activity lies below a light-off value of 50% or 80% and must therefore be increased for an environmentally-compatible operation of the internal combustion engine 20.

Procedures during a cold start that are already known from prior art are explained in the following description on the basis of FIGS. 2 and 3.

Figure 2:
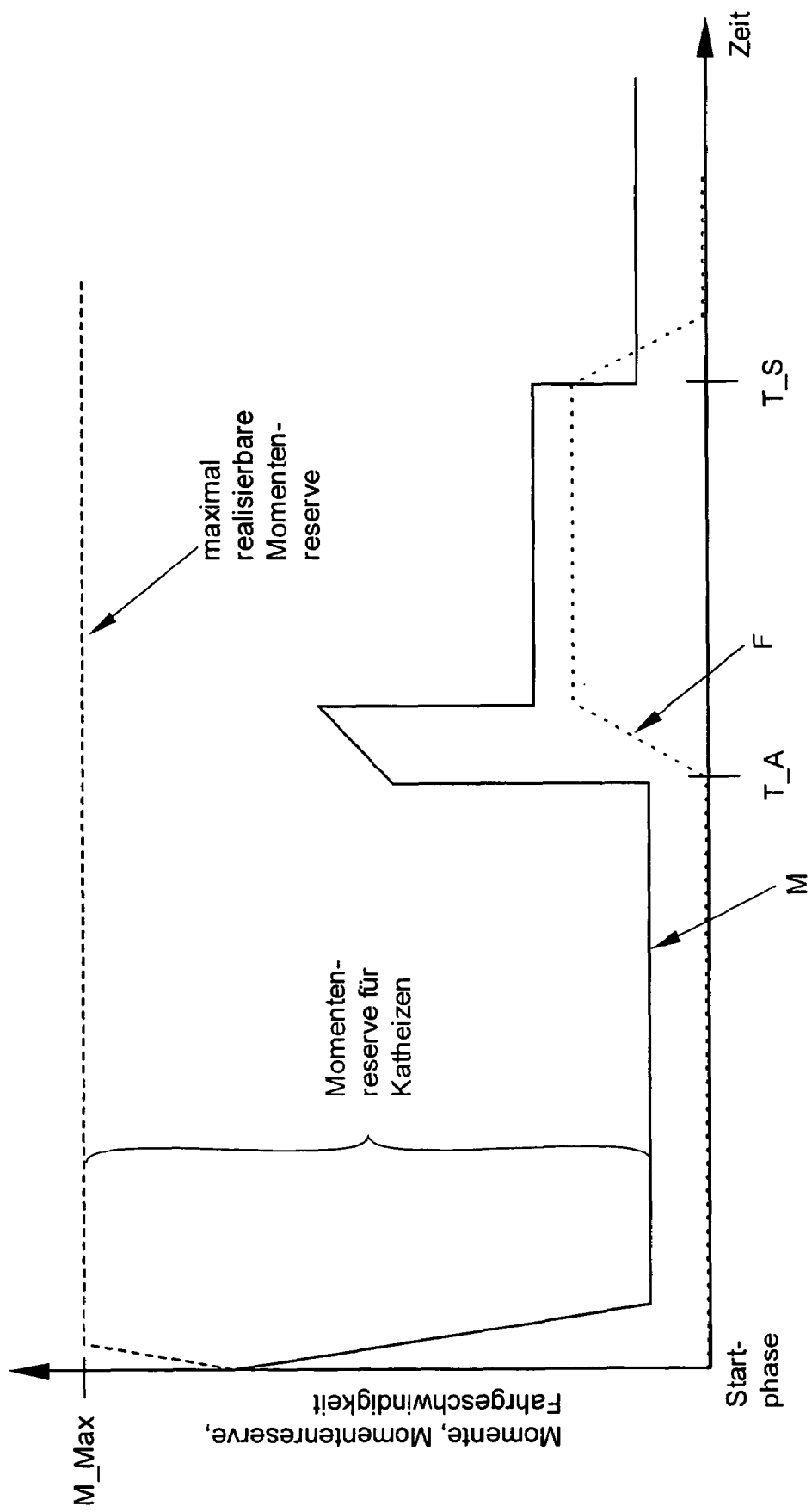
FIG. 2 a sequence in terms of time of the engine torques and running speed for a cold start according to the prior art without electrical support.

FIG. 2 illustrates the sequence in terms of time of an engine torque M of a conventional internal combustion engine during a cold start process. The torque M particularly includes the torques required for the engine start, friction, operation of auxiliaries and driving. F indicates the running speed depending on the time.

In the start activity illustrated, after an idle running phase, a start-up procedure begins from the time-point T_A with an acceleration and a corresponding increase in the torque M. Thus after a relatively short period of time after the start, the internal combustion engine has the maximum torque reserve feasible M_Max that can be used per se for heating the catalytic converter. After a travel phase the running speed at the timepoint T_S is again reduced to zero. The engine load drops accordingly.

In the cold start process illustrated in FIG. 2, the temperature of the catalytic converter system initially lies below the light-off temperature so that large parts of the untreated emission of the internal combustion engine are released into the environment. Only the heating of the engine and/or the exhaust gas also brings about a heating of the catalytic converter system, as long as a separate catalytic converter heating is not provided.

Figure 3:
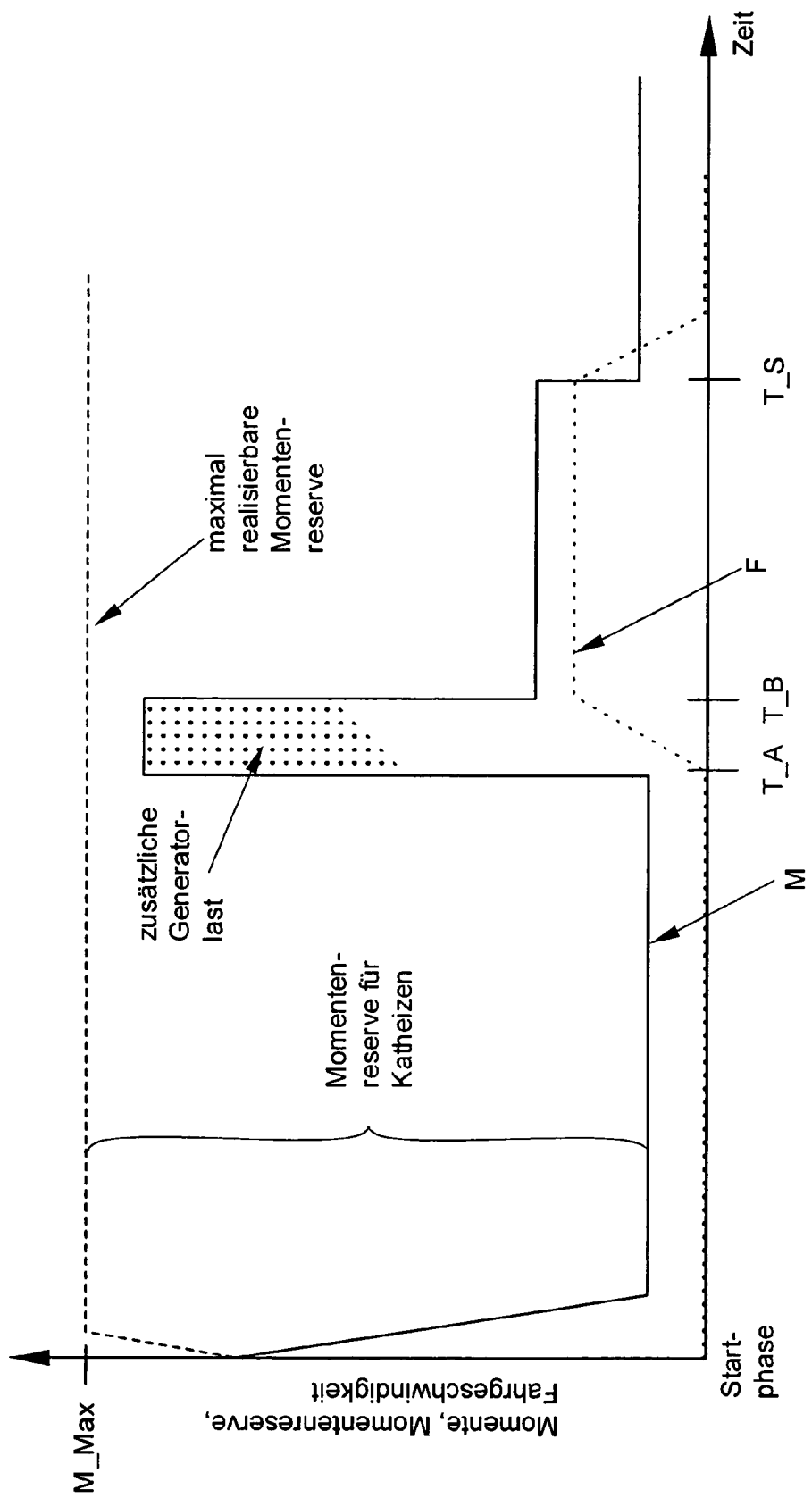
FIG. 3 a sequence in terms of time of engine torques and running speed for a cold start according to prior art with additional electrical generator load.

The operating mode during the cold start that is known from prior art and is illustrated in greater detail in FIG. 3 aims at utilizing the actually existing torque reserve for heating the catalytic converter system. FIG. 3 illustrates a cold start process with an additional electrical generator load for the same driving curve F that is illustrated in FIG. 2. Here, it is assumed that the catalytic converter temperature lies below the light-off temperature. In the time interval between the time points T_A and T_B, the usual charging of the still cold engine is increased up to the limits of a stable engine running for attaining particularly short catalytic converter heating times. The load torque of the internal combustion engine is thus guided up to the maximum torque reserve feasible. However, the increase in the engine load of the internal combustion engine usually also brings about a marked increase in the untreated emissions particularly of hydrocarbons. The emissions reduced by shortening the light-off phase can therefore be overcompensated by an increase in the untreated emissions and lead to an overall increased tail pipe emission.

If the ignition angle is retarded as described in the patent application EP 1 182 074, the temperature of the exhaust gas can be increased. However if there is an additional load request, for example by a start-up process, then the air charge of the internal combustion engine is not canceled. Rather the ignition angle is accelerated such that the required load can be provided by the accompanying improvement in efficiency. This share of energy is then not available for heating the catalytic converter. Therefore, the power made available for heating the catalytic converter can be reduced if the load of the internal combustion engine is raised further by the operation of the electric motor as a generator.

Figure 4:
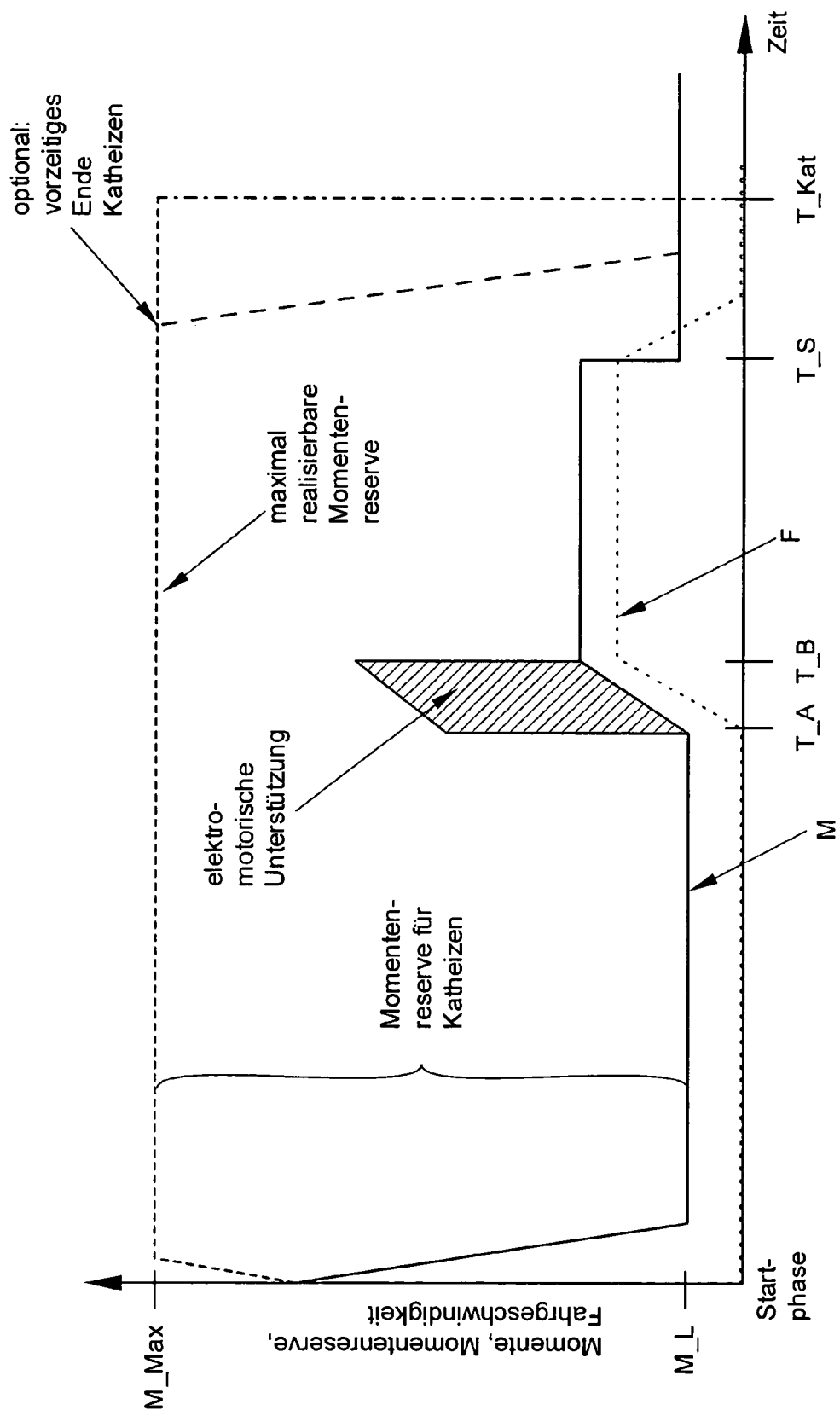
FIG. 4 a sequence in terms of time of engine torques and running speed according to the present invention.

FIG. 4 illustrates the sequence in terms of time of a torque M as well as a running speed F during a cold start operation according to the present invention. Here it is assumed that the catalytic converter has a temperature that lies below the light-off temperature and therefore its conversion activity lies below a conversion threshold. After the start of the internal combustion engine, the internal combustion engine initially delivers an idle running torque M_L that is made available particularly for carrying out the engine start, overcoming friction and supply to the auxiliaries. Preferably M_L is selected in such a way that an acceptable value of untreated emissions in the related point of the operating map is not exceeded.

At the time point T_A, a torque request takes place in order to carry out a start-up procedure. At the timepoint T_B, the start-up procedure is concluded and a constant run with a constant running speed takes place up to the timepoint T_S. According to the present invention, the electric motor 10 provides electromotive support to the internal combustion engine 20 in the time interval T_A to T_B. Therefore, in said time interval, the internal combustion engine 20 provides only a part of the overall torque output required for the start-up procedure, while the electric motor 10 provides the remaining torque required. The prerequisite here is that this should be permitted by the electrical power made available by the electrical storage device 40. At the timepoint T_S, the driving curve F shows a reduction in the running speed that leads to a transition to an idle running at a later timepoint. At the latest at this time-point, the torque output of the internal combustion engine 20 is again restored to the value M_L.

According to the present invention, such an optimization of the torque output of the electric motor 10 and of the internal combustion engine 20 can take place within a time interval T_Kat, which is necessary in order to bring the catalytic converter to a state in which the conversion threshold is attained or exceeded. Usually this state is characterized by a catalytic converter temperature that lies above the light-off temperature for hydrocarbon.

In a preferred embodiment of the present invention, the torque output of the internal combustion engine 20 during the time interval T_Kat is limited to the value M_L so that every additional torque request exceeding this value is attended to by the electric motor 10. Preferably, the electric motor 10 attends to a torque request of at least 60%, preferably of at least 80% and ideally of at least 90% within T_Kat.

According to the present invention, the combustion efficiency of the internal combustion engine 20 is deteriorated in a targeted manner within the time interval T_Kat for attaining an exhaust gas temperature. Such deterioration in efficiency is used for increasing the exhaust gas temperature. A possible method for deteriorating the efficiency is to retard the ignition angle. Thus a higher share of the fuel energy converted in the combustion chamber enters into the exhaust gas. A part of the reduction in efficiency of the engine can also be compensated by an operation with higher charge in that the engine is operated using an increased air-mass flow. Thus a higher exhaust gas mass flow is generated that further accelerates the heating of the catalytic converter.

As is known per se, when retarding the ignition angle, there are lower hydrocarbon concentrations upstream of the catalytic converter due to the increased exhaust gas temperature. Thus the method according to the present invention therefore has the advantage of lower untreated emissions in addition to a higher energy input into the exhaust gas system.

The higher energy input into the exhaust gas system enables a faster through-heating at least of a part of the catalytic converter that is located particularly close to the engine. Thus the heating of the catalytic converter can be reduced. According to the present invention it is preferred to reduce the additional chemical-thermal energy input into the exhaust gas system that is generated for heating the catalytic converter system. Additionally or alternatively, the time interval T_Kat can be reduced by more than 10%, preferably by 25% and most preferably by 40% as compared to a conventional heating of the catalytic converter system.

Since in most countries on earth, the purification effect of the exhaust gas system is predetermined by statutory provisions for limit values for exhaust gas emission, the method according to the present invention as well as the hybrid vehicle according to the present invention are designed in such a way that the legally prescribed limit values are attained or exceeded. In the EU countries, the New European Driving Cycle (NEDC) provides a velocity profile that is supposed to correspond to a typical volume of city traffic and overland traffic. The mentioned design is such that in the NEDC the emissions during an electrical support according to the present invention at least do not exceed the level in a conventional operating mode of the same combustion engine and/or hybrid vehicle.

Figure 5:
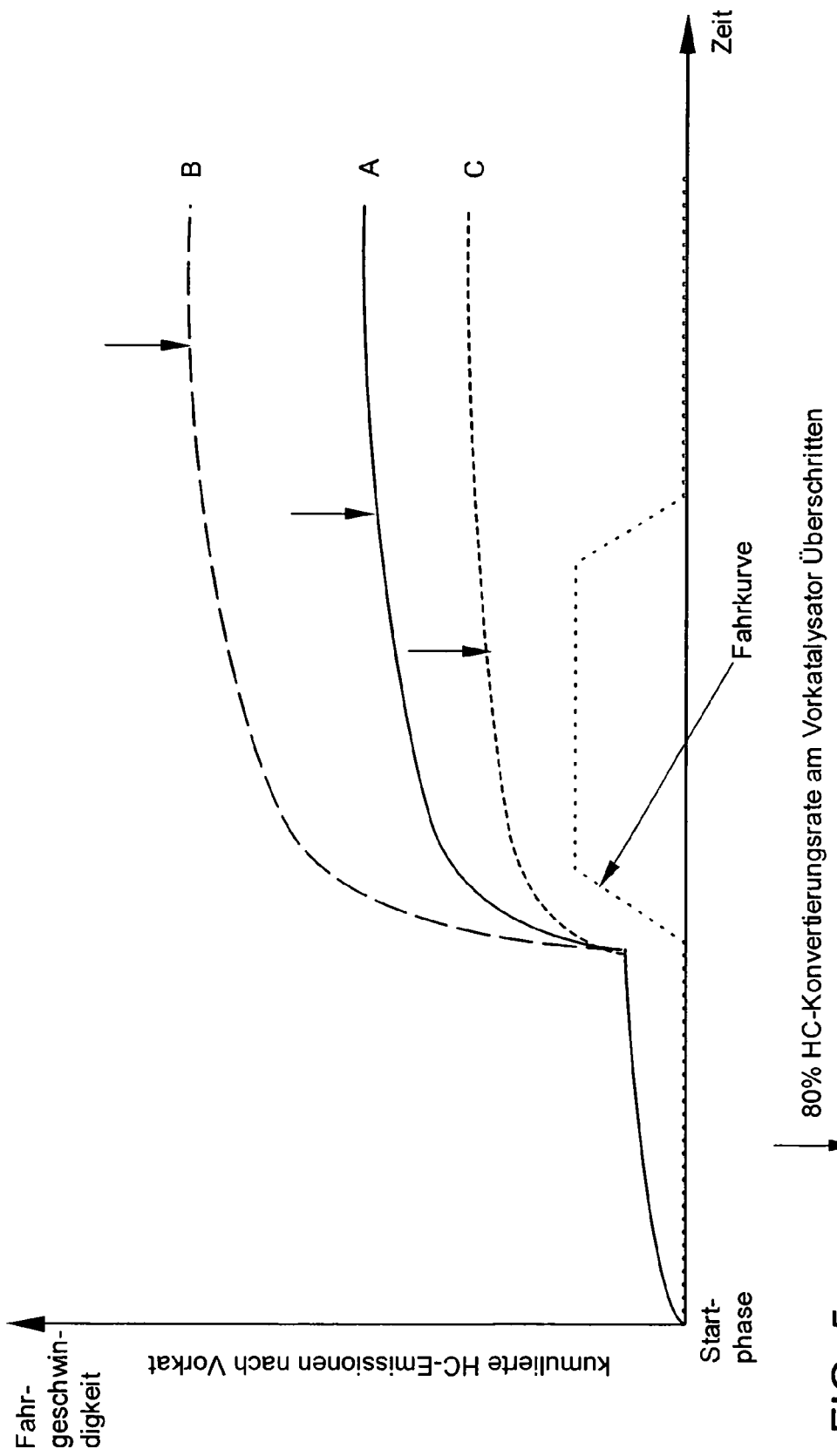
FIG. 5 a sequence in terms of time of the cumulative hydrocarbon emissions after a precatalytic converter located close to the engine in different cold start operating modes.

FIG. 5 schematically illustrates the sequence in terms of time of cumulative hydrocarbon emissions downstream of a precatalytic converter. A cold start procedure having the same driving curve marked with F is illustrated. The emission curve marked with A indicates a conventional catalytic converter heating method that was illustrated in FIG. 2. Curve B indicates a catalytic converter heating process in which a negative torque is used in the cold start phase while the curve C indicates an operation suggested by the method according to the present invention. The arrow placed from the top on each of the curves A to C indicates the timepoint at which an 80% HC conversion rate of the precatalytic converter is exceeded.

As illustrated in FIG. 5, the operating mode according to the present invention enables a lower cumulative hydrocarbon emission as well as an early attainment of an 80% hydrocarbon conversion rate of the precatalytic converter.

Since the present invention facilitates the attainment of a light-off value of the catalytic converter system or at least of one of its components, the precious metal content of the catalytic converters used in such a hybrid vehicle can be reduced. This particularly applies for vehicles having direct injection gasoline engine and/or gasoline engine capable of stratified charge. In prior art, catalytic converters having a precious metal content of <110 g/km/ft$^3$ (3.95 g/dm$^3$) or even <130 g/ft$^3$ (4.76 g/dm$^3$) are used in case of direct injection gasoline engines and/or gasoline engines capable of stratified charge as in the NEDC having thermally undamaged catalytic converters that achieve a hydrocarbon emission of 0.07 g/km and a NO$_x$ emission of >0.05 g/km in case of a stratification operation amount in terms of time of at least 250 seconds. In this case, the catalytic converter system consists of a precatalytic converter that is located close to the engine and at least one NO$_x$ storage catalytic converter that is arranged downstream and has a stored sulfur mass of >0.2 gram/per liter catalyst volume.

According to the present invention, the precious metal content of at least the precatalytic converter/s is reduced to less than 100 g/ft$^3$ (3.59 g/dm$^3$) particularly to ≧80 g/ft$^3$ (2.87 g/dm$^3$). It is preferred to reduce the precious metal content to less than 60 g/ft$^3$ (2.16 g/dm$^3$). This helps achieve a hydrocarbon emission of not more than 0.1 g/km and a NO$_x$ emission of 0.08 g/km even after the oven aging of at least one precatalytic converter having reduced precious metal content for four hours at 1,100 degrees Celsius in an atmosphere of 2% O$_2$ and 10% H$_2$O and the oven aging of a NO$_x$ storage catalytic converter having reduced precious metal content for four hours at 850 degrees Celsius in an atmosphere of 2% O$_2$ and 10% H$_2$O in case of the same vehicle by using the method according to the invention in the NEDC.

The electric motor 20 has a maximum power of at least 2 KW, preferably 3.5 KW, and most preferably 5 KW per ton of vehicle empty weight. A speed range of 700-1,500, ideally 1,000 l/min to 1,500 l/min is preferred.

LIST OF REFERENCE SYMBOLS

1 Hybrid drive system with control system
10 Electric motor
20 Internal combustion engine
30 Gearbox
40 Battery
50 Exhaust gas system
60 Precatalytic converter
70 Main catalytic converter
80 Sensors
90 Motor control unit
90a Device for controlling the torque output
100 Sensors

What is claimed is:

1. A method for operating a hybrid vehicle comprising an internal combustion engine, at least one electric motor, each for the output of a torque to at least one vehicle wheel, and an exhaust gas system having a catalytic converter system for at least one exhaust gas component assigned to the internal combustion engine, wherein the catalytic converter system contains at least one precatalytic converter located close to the engine and at least one main catalytic converter arranged downstream of the precatalytic converter, wherein a conversion activity of the catalytic converter system is dependent on predetermined activity parameters, the method comprising the steps of:

determining the value of the conversion activity for attaining a predetermined conversion threshold of the conversion activity for at least one exhaust gas component in a predetermined time interval; and if the value lies below said threshold, then increasing the torque output of the electric motor, and reducing the torque output of the internal combustion engine as compared to an operation of the hybrid vehicle without the provision of a torque by the electric motor, wherein the combined torque delivered by the internal combustion engine and the electric motor is used to drive the hybrid vehicle;

wherein the internal combustion engine is a direct-injection gasoline capable of stratified-charge capable of lean-burn and the precatalytic converter having a lowered precious metal content is subjected to an oven aging process for 4 hours at 1100° C. in an atmosphere of 2% O$_2$ and 10% H$_2$O and the NO$_x$ storage catalytic converter having a lowered precious metal content is subjected to an oven aging process for four hours at 850° C. in an atmosphere of 2% O$_2$ and 10% H$_2$O.

2. A method according to claim 1, wherein the step of increasing the torque output of the electric motor is performed depending on the load.

3. A method according to claim 1, wherein the exhaust gas emission downstream of the catalytic converter system is determined and the torque output of the internal combustion engine and/or of the electric motor is increased and/or decreased such that a predetermined emission limit value downstream of the catalytic converter system is exceeded.

4. A method according to claim 1, wherein the activity parameters contain at least one catalytic converter temperature or an exhaust gas mass flow.

5. A method according to claim 1, wherein the predetermined time interval is associated with a cold start.

6. A method according to claim 1, wherein the electric motor attends to a torque request of at least 60%, or of at least 80% or of at least 90% within the predetermined time interval.

7. A method according to claim 6, wherein the internal combustion engine is operated using a higher air charge for at least partially compensating an efficiency deterioration of the internal combustion engine due to a retardation of the ignition angle.

8. A method according to claim 1, wherein the combustion efficiency of the internal combustion engine is deteriorated in a targeted manner within the predetermined time interval for increasing an exhaust gas temperature and an exhaust gas mass flow.

9. A method according to claim 1, wherein the ignition angle is shifted for retardation for increasing the catalytic converter temperature.

10. A method according to claim 1, wherein a catalytic converter heating with a chemical-thermal energy input into the exhaust gas system is provided where said energy input is reduced by at least 10%, 25% or preferably 40% as compared to an operation without the provision of a torque by the electric motor.

11. A method according to claim 1, wherein a catalytic converter heating is provided that has a value, which is reduced in terms of time by at least 10%, 25% or 40% as compared to an operation without the provision of a torque by the electric motor.

12. A method according to claim 1, wherein the electric motor provides a maximum power of at least 2 KW, 3.5 KW, or 5 KW per ton of vehicle empty weight in a speed range of 700-1500 1/min, or 1,000 1/min to 1,500 1/min.

13. A method according to claim 1, wherein the electric motor is arranged between a crankshaft outlet of the internal combustion engine and a gearbox inlet.

14. A method according to claim 1, wherein the precatalytic converter located close to the engine is arranged at a distance of less than 500 mm or less than 400 mm or less than 300 mm of the average exhaust gas run length from the cylinder head flange.

15. A method according to claim 1, wherein the conversion threshold is a light-off value for at least one of the exhaust gas components:
hydrocarbon, carbon monoxide or nitrogen oxide of the precatalytic converter and the main catalytic converter.

16. A method according to claim 1, wherein the internal combustion engine is a direct-injection gasoline engine capable of a lean-burn.

17. A method according to claim 16, wherein the internal combustion engine according to the New European Driving Cycle has a thermally undamaged catalytic converter system that comprises at least one precatalytic converter located close to the engine and at least one $NO_x$ storage catalytic converter arranged downstream, where at least one of the catalytic converters has a precious metal content of >110 g/ft$^3$ and attains a hydrocarbon emission of <0.07 g/km and a nitrogen oxide emission of <0.05 g/km in a stratification operation unit in terms of time of at least 250 seconds without provision of a torque by the electric motor, if the torque is provided by the electric motor and if the precatalytic converter has a precious metal content of <100 g/ft$^3$, preferably <80 g/ft$^3$ and most preferably <60 g/ft3, then at least one of the catalytic converters attains a hydrocarbon emission of lesser than 0.1 g/km and a nitrogen oxide emission of lesser than 0.08 g/km according to the New European Driving Cycle.

18. A method according to claim 1, wherein the internal combustion engine is a direct-injection gasoline capable of stratified-charge capable of lean-burn.

* * * * *